United States Patent [19]
Günter et al.

[11] Patent Number: 5,476,720
[45] Date of Patent: Dec. 19, 1995

[54] FILMS OF KTN AND KTAO$_3$

[76] Inventors: Peter Günter, Püntstrasse 17, CH-8173 Riedt-Neerach, Switzerland; Roland Gutmann, Spitalstrasse 45, CH-8620 Wetzikon, Switzerland; Jürg Hulliger, An der Specki 35, CH-8053 Zurich, Switzerland

[21] Appl. No.: 992,952

[22] Filed: Dec. 18, 1992

[51] Int. Cl.$^6$ .................................................. B32B 18/00
[52] U.S. Cl. .......................... 428/471; 428/472; 428/697; 428/699; 428/700; 428/701; 428/702; 501/134
[58] Field of Search ................................ 428/469, 471, 428/472, 697, 699, 700, 701, 702; 501/134

[56] References Cited

U.S. PATENT DOCUMENTS

| | | | |
|---|---|---|---|
| 4,093,781 | 6/1978 | Heinz ........................................ | 428/700 |
| 4,097,636 | 6/1978 | Hawrylo et al. ........................... | 428/700 |
| 5,034,949 | 7/1991 | Gunter ....................................... | 372/21 |
| 5,198,269 | 3/1993 | Swartz et al. .............................. | 427/226 |

FOREIGN PATENT DOCUMENTS 2262520  12/1992  United Kingdom .

OTHER PUBLICATIONS

Derwent Abstracts of: EP–203206; JG1232299; CH–656894; J52074600; J02259608; INSPEC Data Base Search Report Abstract Nos. A89099811; A90090999; A89143361; A86117199; A84076695; A80079016; A79033204; A79015041; A90015411; A88124063; A87137753.

Liquid phase epitaxy of lattice–matched KTa$_{1-x}$Nb$_x$O$_3$ grown on KTaO$_3$ substrate, R. Gutmann, J. Hulliger and E. Reusser, Journal of Crystal Growth 00 (1992), pp. 1–11.

Nonlinear integrated optics, George I. Stegeman and Colin T. Seaton, J. Appl. Phys. 58 No. 12 (15 Dec. 1985), pp. R–57–R–77.

Study of Ferroelectric Transitions of Solid–Solution Single Crystals of KNbO$_3$–KTaO$_3$, S. Triebwasser, International Business Machines Corp., NY (Nov. 13, 1958), pp. 63–70.

Ferroelectric Thin Films, S. L. Swartz and V. E. Wood, vol. 1, No. 5, 1992, Condensed Matter News, pp. 4–13.

Auger electron and x–ray photoelectron spectroscopy of monocrystalline layers of KTa$_{1-x}$Nb$_x$O$_3$ grown by liquid–phase epitaxy, R. Gutmann, J. Hulliger, R. Hauert and E. M. Moser, Journal of Applied Physics, vol. 70, 1. Sep. 1991, No. 5, pp. 2648–2653.

Chemical Abstract of 116:116389b and 95:213739w.

Studies on the System (1–x) NaNbO$_3$xKTaO$_3$, Hiroshi Iwasaki, Electrical Communication Laboratory, Nippon Telegraph & Telephone Public Corp., Musashino, Tokyo, Journal of the Physical Society of Japan, vol. 17, No. 5, May 1962, pp. 779–784.

*Primary Examiner*—Ellis P. Robinson
*Assistant Examiner*—Timothy M. Speer
*Attorney, Agent, or Firm*—Robert S. Honor; Carl W. Battle; Michael P. Morris

[57] ABSTRACT

The invention relates to new films for applying to a substrate and to methods for producing them.

A composition, for use in preparing a film, (preferably an epitactic film) comprising a solid solution of KNbO$_3$ and KTaO$_3$ forming a product of formula I $$K_{1-y}M_yTa_{1-x}Nb_xO_3 \qquad (I)$$

in which M is a monovalent metal ion other than K$^+$ (hereinafter defined as the dopant);
y=0.02 to 0.20 and
x=0.05 to 0.95.

5 Claims, No Drawings

FILMS OF KTN AND KTAO₃

The invention relates to compositions capable of producing film on a substrate, to methods for producing such films and to films produced thereby. Such films are preferably epitaxial films of KTN ($KTa_{1-x}Nb_xO_3$).

According to the invention there is provided a composition, for use in preparing a film (preferably an epitactic film) comprising a solid solution of $KNbO_3$ and $KTaO_3$ that forms a product of formula I $$K_{1-y}M_yTa_{1-x}Nb_xO_3 \qquad (I)$$

in which M is a monovalent metal ion other than $K^+$ (hereinafter defined as the dopant);

y=0.02 to 0.20 and
x=0.05 to 0.95.

The product of formula 1 is known as KTN, doped with metal M.

Generally the dopant is a monovalent ion.

Preferably the dopant is selected from alkali metals (other than $K^+$) and $Ag^+$. More preferably the dopant is selected from $Na^+$, $Li^+$ and $Ag^+$.

Preferably in a composition according to the invention, x is 0.2 to 0.85, more preferably 0.2–0.7, most preferably 0.2–0.6, especially 0.3 to 0.45.

Preferably to produce a ferroelectric film, x is 0.4 to 0.6 in the composition of the solid solution.

Preferably to produce a paraelectric film, x is 0.3 to 0.4.

The terms "ferroelectric" and "paraelectric" are terms of the art and are defined in Phys. Rev. 114 (1959) 63 et. seq., the contents of which are incorporated herein by reference.

Preferably for cubic paraelectric layers, x is 0.6–0.7, preferably 0.68 in the liquid.

Preferably, for tetragonal ferroelectric layers, x is 0.7 to 0.85, more preferably 0.75 to 0.85, most preferably 0.82.

Further according to the invention, there is provided a substrate on which a product of formula I $$K_{1-y}M_yTa_{1-x}Nb_xO_3 \qquad (I)$$

in which M is a monovalent metal ion other than $K^+$;

y=0.02 to 0.20 and
x=0.05 to 0.95;

has been applied as a film or coating layer.

Such substrates include metals (e.g. Pt or Au) and crystals such as $KTaO_3$ ($KTaO_3$ is the most preferred substrate). Preferred substrates are those having a lattice constant of 3.8–4.2, more preferably 3.9–4.10, most preferably 3.9883.

The film may be applied either over the whole surface of the substrate or over a part of the surface.

Preferably the composition produces one homogeneous built-up layer with periodic arrangement of the atoms with the same periodicity as the crystal lattice on the surface of the substrate (e.g. a crystal).

It has been found that this composition yields films having substantially reduced (or being substantially free from) misfit dislocations with the substrate, especially when the substrate is $KTaO_3$.

Misfit dislocations are well known in the art and occur when the lattice constant difference of the substrate differs sufficiently from that of the film.

Still further according to the invention there is provided a solution, for producing an epitactic film on a substrate having lattice constant of 3.8–4.2, comprising a product of formula I $$K_{1-y}M_yTa_{1-x}Nb_xO_3 \qquad (II)$$

in which

M is a monovalent ion other than $K^+$;
x is 0.05–0.95; and
y is 0.02 to 0.20;

in a solvent system selected from KF/NaF, KF/LiF, $K_2O/Na_2O$, $K_2O/Li_2O$, $K_2MoO_4/Na_2MoO_4$ and $K_2MoO_4/Li_2MoO_4$. (Preferably a true solution is formed).

Preferably about 0.05% of the total amount of KTN in the solution or about 5 mg of KTN is required per cm² per layer thickness where the layer is 0.1–100 μm, more preferably 1–20 μm, most preferably about 10 μm.

Preferably from such a solution, the resulting film has 2 to 20 mol % of $K^+$ ion replaced by dopant ions, i.e. $Na^+$ or $Li^+$.

The preferred solvent, when a thin film is required, is selected from KF/NaF and KF/LiF. The preferred solvent when a thick film is required is selected from $K_2O/Na_2O$ and $K_2O/Li_2$.

Preferably in a solution according to the invention, a KF/NaF or KF/LiF solvent system comprises 80–98 mol % and KTN 20–2 mol %. Alternatively KTN comprises 90–99 mol % and a $K_2O/Na_2O$ or $K_2O/Li_2O$ solvent system 10–1 mol %. The amount of dopant containing solvent (e.g. NaF or LiF or $Na_2O$ or $Li_2O$ respectively) in the solvent system is 2–20 mol %, based on the weight of the solvent system.

A most preferred solution is KTN 5–10 mol % and 90–95 mol % of a solvent system (or solution) of KF and NaF (KF being from 80–98 mol % and NaF being from 2–20 mol % of said solvent system).

Yet further according to the invention there is provided a process for preparing one or more film layers (preferably epitactic) on the surface of a substrate, the substrate having having a lattice constant of 3.8–4.2, comprising i) dissolving 5–95 mol % of $KNbO_3$ and 95–5 mol % of $KTaO_3$ in a solvent selected from KF/NaF, KF/LiF, $K_2O/Na_2O$, $K_2O/Li_2O$, $K_2MoO_4/Na_2MoO_4$, and $K_2MoO_4/Li_2MoO_4$; and ii) immersing or dipping the substrate in said solution at an elevated temperature.

The preferred elevated temperature is from 860° to 1200° C.

Preferably the thickness of the layer is from 0.5 to 200 μm, more preferably 1–5 μm (thin films) or 50–200 μm (thick films).

Further according to the invention, there is provided a $KTaO_3$ crystal to which a film has been applied, preferably an epitactic film, the film composition comprising i) 5–95 mol % $KNbO_3$
ii) 95–5 mol % $KTaO_3$ and containing 2 to 20 mol % of $K^+$ ion replaced by dopant (as herein before defined).

The substrates, especially $KTaO_3$ crystals, to which a film according to the invention has been applied can be used in the field of integrated optics, for example in electrooptic and acoustooptic modulators for optical frequency conversion, for pyroelectric sensors (heat sensors), piezoelectric sensors or for ferroelectric memory devices.

Reference is made to the article "Nonlinear Integrated Optics" by G. I. Stegeman and C. T. Seaton in J. Appl. Phys. 58(1985) R57 with regard to integrated optics. Reference is made to the article by S. L. Swartz and V. E. Wood, in Condensed Matter News 1 (1992)5 with regard to ferroelectric memories, the contents of each of the above references being incorporated by reference.

The advantage of using the preferred solvents is that a sufficient degree of solubility of $KNbO_3$ and $KTaO_3$ is achieved whilst having a reasonable melting point and at the same time allowing for supercooling between 30° and 100° C.

For non-lattice-matched layers e.g. where f (the lattice constant difference)>10⁻³

$$f = \frac{a_L - a_S}{a_S}$$

where $a_L$ is the lattice constant of the layer and
$a_S$ lattice constant of the substrate, a pronounced defect pattern can be seen, induced by lattice relaxation by cooling down to room temperature after growth. These defects can be overcome by the present invention. Should color occur in the layers (due to the highly reductive nature of KF for example) this can be removed by annealing in $O_2$.

According to the invention there is also provided a pyroelectric sensor or ferroelectric memory device containing a $KTaO_3$ crystal coated with an epitactic film comprising a) 5–95 mol % of $KNbO_3$ and
b) 95–5 mol % $KTaO_3$ containing 2 to 20 mol % of a monovalent metal other than $K^+$ (hereinafter defined as the dopant).

For use in a ferroelectric device, KTN is grown on $KTaO_3$. On top of the KTN layer, an electrode of Au or Ag may be deposited by known art methods. For a thickness of >10µ, the KTN has to be poled since the domain structure for these layer thicknesses diminishes the effective electrooptic and pyroelectric effects. For a pyroelectric device, a temperature change will induce an electric charge in the layer induced by a displacement in the internal atomic structure. This electric charge is removed by a contacted wire, which induces a signal which can be amplified and hence used as an alarm system.

In this specification, unless stated otherwise all % are mol %.

The invention will now be illustrated by the following Example.

EXAMPLE

Lattice matched epitaxial $KTa_{0.71}Nb_{0.29}O_3$ (i.e., 71 mol % $KTaO_3$+29 mol % $KNbO_3$) layers with a Na content of 10.4 mol % (i.e 10.4% of K ions are replaced by Na ions) are grown from a solution containing 93% KF (88.5 mol %)–NaF (11.5 mol %) solvent with 7 mol % of KTN where the KTN is $KTa_{0.32}Nb_{0.68}O_3$ on a $KTaO_3$ substrate at 950°–960° C. The solution containing compounds is mixed and filled into a Pt crucible. For the dissolution of KTN in the given solvent, the furnace is heated up to 1050° C. with ~120° C./h, kept at this temperature for ~8–12 hours and slowly (60° C./h) cooled to the epitaxial temperature given by the flux composition and Nb concentrations. Then, after a dwelling time at the epitaxial temperature of about 30 minutes, the Pt mounted substrate is dipped into the supercooled solution for the necessary growth time, given by required film thickness. After the growth time the substrate with the film is removed from the solution and slowly (50° C./h) cooled to room temperature. After cooling, the substrate and the film are removed from the substrate holder and cleaned in water an phosphoric acid. This $KTaO_3$ crystal is described in Landolt-Boemstein, Numerical Data and Functional Relationships on Science and Technology, Group III vol. 16, Ferroelectric Oxide, the content of which is incorporated herein by reference.

A $KTaO_3$ crystal oriented along (100) of dimensions between 3×3×0.3 and 10×10×2 mm is dipped into the above solution at 950°–960° C. The growth time is between 5 and 30 minutes for layers of thickness between 2 and 3 microns.

The surface of the substrate on which the KTN is grown is 0.2 to 1 cm², thickness 10 µm (about 6 mg). The amount of solvent used is as much as possible for a stable condition of the KTN solution to be formed.

The substrate is oriented parallel to a (100) plane. The growth times for 2 to 30 µm thick layer vary between 5 and 30 min. The lattice constant difference f (misfit) for lattice matched layers is f<2.8+0.4×10⁻⁴. (For non lattice matched layers with an equivalent composition, f is 1.5×10⁻³. Such layers show a pronounced defect pattern induced by lattice relaxation by the cooling down to room temperature after growth.) Where the addition of NaF to the solvent reduces the solubility, this can be corrected by the use of higher growth temperatures of 1.2° C./mol % NaF. The coloration can be removed by annealing in $O_2$ at 980° C. for 20 hours. The discoloration is also related to the lower fluorine content following the $O_2$ annealing step.

For optical measurements, such as standard waveguiding experiments, the layer surface and the head face (face perpendicular to a layer surface) are polished. Polishing of the layer surface and side face may be with a diamond paste of 1 and ¼ µm grain size.

Waveguiding experiments on non lattice matched layers show strong scattering, caused by the defect pattern. This scattering can be avoided by the lattice matching of the film of the Example. The refractive index of $Na^+$ doped samples are not influenced by the incorporation of $Na^+$.

The layer produced with this method can be used for active elements for integrated optics, e.g. as a light modulator or for optical frequency conversion devices (blue or green upconverted lasers). The process for the growth of single crystalline epitaxial layers for different optoelectronic applications can be modified when para- or ferro-electric layers of $KTa_{1-x}Nb_xO_3$ need to be grown.

For paraelectric layers the KTN content of the e.g. KF/NaF/KTN solution contains 3–8 mol % KTN with a Nb content of x=0.68.

For ferroelectric layers with a Curie temperature of ~65° C., the KTN content of the e.g. KF/NaF/KTN solution contains 3–8 mol % KTN with a Nb content of x=0.82.

We claim:

1. A substrate on which a product of formula I $$K_{1-y}M_yTa_{1-x}Nb_xO_3 \qquad (I)$$

in which M is a monovalent metal ion other than $K^+$;
y=0.02 to 0.20 and
x=0.05 to 0.95,
has been applied as an epitaxial coating layer.

2. A coated substrate according to claim 1 in which the substrate is one having a lattice constant of 3.8–4.2.

3. A coated substrate according to claim 2 in which the substrate comprises a metal or a crystal.

4. A coated substrate according to claim 3 in which $KTaO_3$ is the substrate.

5. A $KTaO_3$ crystal to which an epitaxial film has been applied, the film composition comprising:

i) 5–95 mol % $KNbO_3$ ii) 95–5 mol % $KTaO_3$ and containing 2 to 20 mol % of a monovalent metal other than $K^+$.

* * * * *